United States Patent
Rosman

(10) Patent No.: US 11,741,698 B2
(45) Date of Patent: Aug. 29, 2023

(54) CONFIDENCE-ESTIMATED DOMAIN ADAPTATION FOR TRAINING MACHINE LEARNING MODELS

(71) Applicant: TOYOTA RESEARCH INSTITUTE, INC., Los Altos, CA (US)

(72) Inventor: Guy Rosman, Newton, MA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 410 days.

(21) Appl. No.: 16/898,370

(22) Filed: Jun. 10, 2020

(65) Prior Publication Data

US 2021/0390352 A1 Dec. 16, 2021

(51) Int. Cl.
*G06K 9/62* (2022.01)
*G06V 10/96* (2022.01)
(Continued)

(52) U.S. Cl.
CPC ......... *G06V 10/96* (2022.01); *G05B 13/0265* (2013.01); *G06F 18/2193* (2023.01);
(Continued)

(58) Field of Classification Search
CPC .......... G06N 20/00; G06N 20/20; G06N 3/08; G06N 3/006; G06N 5/003; G06N 20/10; G06N 3/02; G06V 20/58; G06V 10/776; G06V 10/96; G06V 20/56; G06V 20/588; G06V 20/59; G06V 30/194; G06V 10/70; G08G 1/166; G08G 1/165; G08G 1/16; G08G 61/165; G06K 9/6265; G06K 9/62; G06K 9/00; G05B 13/0265; G05B 13/02; G05B 13/04; G05B 19/41895; G05B 13/00; G05B 15/00; G05B 2219/32334; G05B 2219/33041; G05B 2219/36039; G06F 30/27; G06F 30/20; G05D 1/0221;
(Continued)

(56) References Cited

U.S. PATENT DOCUMENTS 11,227,187 B1 * 1/2022 Weinberger .......... G06K 9/6256
2017/0154425 A1   6/2017 Pierce
(Continued)

FOREIGN PATENT DOCUMENTS

| CN | 111340233 A | * | 6/2020 | ............. G06N 7/005 |
| JP | 2020201870 A | * | 12/2020 | ............. G06N 20/00 |
| NL | 3614313 A1 | * | 2/2020 | ............... G06N 3/04 |

OTHER PUBLICATIONS

Determining The Fit of Machine Learning Models to Data Sets; KR 20210032521 A (Year: 2021).*

*Primary Examiner* — Meless N Zewdu
(74) *Attorney, Agent, or Firm* — Sheppard, Mullin, Richter & Hampton LLP; Hector A. Agdeppa; Daniel N. Yannuzzi

(57) ABSTRACT

Embodiments of the present disclosure comprise systems and methods that implement domain adaptation. For example, some embodiments may improve standard machine learning systems by providing a best estimation of unknown situations using existing trained models. The trained models may be adapted to use in new scenarios that might not have been identified during the training phase of the machine learning. Using this adaptive approach, the model can help the vehicle system prepare a best estimate of the environment that was not identified during training and take an appropriate action.

24 Claims, 5 Drawing Sheets

(51) Int. Cl.
  *G06N 20/00* (2019.01)
  *G08G 1/16* (2006.01)
  *G05B 13/02* (2006.01)
  *G06V 20/58* (2022.01)
  *G06F 18/21* (2023.01)
  *G06V 20/56* (2022.01)
  *G06V 10/776* (2022.01)

(52) U.S. Cl.
  CPC ............ *G06N 20/00* (2019.01); *G06V 20/56* (2022.01); *G06V 20/58* (2022.01); *G08G 1/165* (2013.01); *G06V 10/776* (2022.01)

(58) Field of Classification Search
  CPC ........... H04W 4/40; H04W 4/38; H04W 4/44; H04W 4/46; H04W 4/48
  See application file for complete search history.

(56) References Cited

U.S. PATENT DOCUMENTS

| | | | |
|---|---|---|---|
| 2018/0330238 | A1 | 11/2018 | Luciw |
| 2019/0294999 | A1* | 9/2019 | Guttmann ............... G06N 20/10 |
| 2020/0297237 | A1* | 9/2020 | Tamersoy et al. ... A61B 5/0555 |
| 2020/0311615 | A1* | 10/2020 | Jammalamadaka et al. ................ G06N 20/20 |
| 2021/0201070 | A1* | 7/2021 | Omari et al. ......... G06K 9/6212 |
| 2021/0286989 | A1* | 9/2021 | Zhong et al. ...... G06K 9/00456 |
| 2021/0295191 | A1* | 9/2021 | Bui et al. ............... G06N 7/005 |
| 2021/0380099 | A1* | 12/2021 | Lee et al. .............. B60W 30/09 |

* cited by examiner

CONFIDENCE-ESTIMATED DOMAIN ADAPTATION FOR TRAINING MACHINE LEARNING MODELS

TECHNICAL FIELD

The present disclosure relates generally to machine learning, and in particular, some implementations may relate to a machine learning system that receives non-specific or generic data and adapts it for machine learning models that implement a specific function.

BACKGROUND

Typically machine learning models are trained using data relevant to a specific use case so that the machine learning models may be employed to perform a specific function. However, in many cases there may only be general data rather than data that is relevant to the specific use case, a narrow use case, or an unforeseen use case. Better machine learning models are desired.

BRIEF SUMMARY OF THE DISCLOSURE

Some embodiments of the present disclosure are directed to systems, methods, and apparatuses for updating a first machine learning model. In some embodiments, the system may comprise a receiver configured to receive first input data; a memory configured to store the first machine learning model and a set of features corresponding to the first input data used during training of the first machine learning model; and a processor configured to train the first machine learning model. The model may comprise, in some examples, train the first machine learning model to correlate an image or action in the first input data with a first training task; determine a first accuracy score of the first machine learning model when the first machine learning model is applied to a second training task using the first input data; using second input data, compute a second accuracy score per data example in the second input data, wherein the second input data includes different images or actions than the first input data; and regress the second accuracy score per data example using a second machine learning model, wherein the second machine learning model is trained to correlate the different images or actions in the second input data to the second training task.

In some embodiments, the first accuracy score and the second accuracy score may implement a density estimation.

In some embodiments, the system performs a third training task, and the system selects a third machine learning model from a plurality of machine learning models based on a corresponding accuracy score for the third machine learning model.

In some embodiments, the trained machine learning model is transmitted to a vehicle, and wherein the vehicle performs an action based on the trained machine learning model. In some examples, the action includes alerting a driver of the vehicle to a potential hazard. In some examples, the action includes slowing the vehicle. In some embodiments, the second machine learning model is updated at the vehicle, and wherein the vehicle transmits confidence estimates corresponding to the second machine learning model to the receiver.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
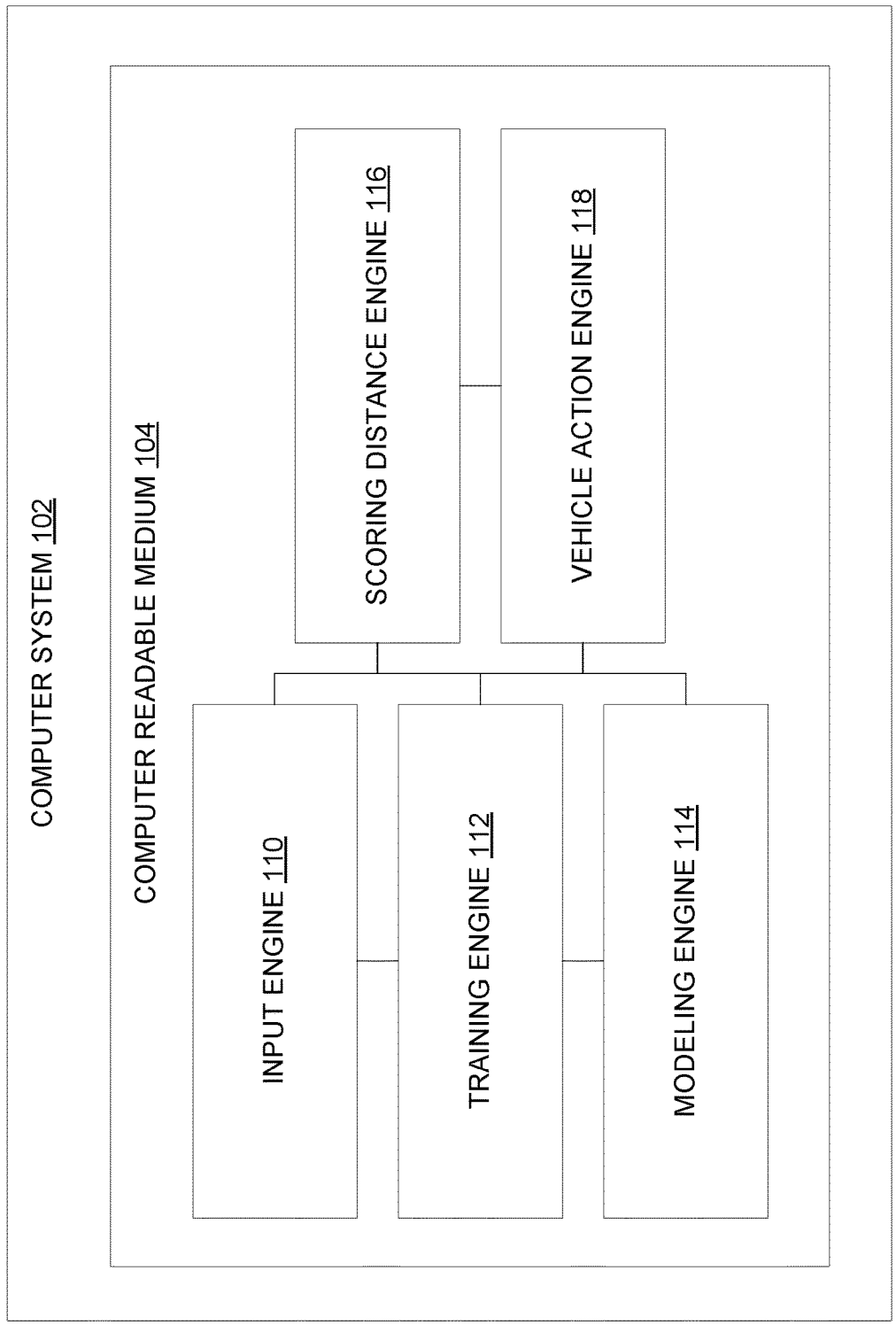
FIG. 1 is an illustrative representation of a computer system for implementing domain adaptation, in accordance with one or more embodiments of the disclosure.

The figures are not exhaustive and do not limit the present disclosure to the precise form disclosed.

DETAILED DESCRIPTION

Traditional machine learning models (e.g., neural networks, etc.) are trained for a specific task and generally receive specific data for that task. A task may include inference output produced by a machine learning model based on input, weights, and biases tuned with the machine learning model. For example, a dog recognition machine learning model may receive one thousand images of dogs and cats and the training of the model may identify which images include a dog and which images include a cat, where the task is identifying which images include a dog or a cat. Training of these traditional machine learning models may not include a lot of general data. After training, the model is then applied to a more narrow task (e.g., only identifying a dog), to identify when the adapted model works well and when it does not. In a vehicle example, tasks may correspond with autonomous driving, including a determination of whether to change lanes, speed up or slow the vehicle with respect to input data of various road conditions (e.g., other vehicles, traffic signals, etc.).

To perform the prospective task, the vehicle may require a given level of confidence in the accuracy of the output of a machine learning model. For example, to perform the lane change, the vehicle may require a 95% confidence in the accuracy of the predicted trajectories of other vehicles as output by the machine learning model.

In each of these systems, general machine learning systems may include driving data using images and other data that a driver might see from the vehicle. However, this general driving data does not include data for all possible scenarios. For example, a source of the driving data (e.g., an autonomous vehicle with a camera and other sensors, etc.) may capture general driving data based on environments that it encounters while driving on standard city streets. The vehicle may not have encountered a camel on the road. As such, with no training data corresponding to the camel in the road, the trained machine learning model that used the source driving data may be bad at estimating that a camel has been encountered.

Embodiments of the present disclosure seek to improve the standard machine learning systems by providing a best estimation of unknown situations using existing trained models. The trained models may be adapted for use in new scenarios that might not have been identified during a first of one or more machine learning training phases. For example, the machine learning training phases may include a first, large scale and general machine learning training phase that can train the model for a general task. The second machine learning training phase may be an adaptation phase that adapts the first training phase to a task-specific and/or smaller data set. Using this adaptive approach, the model can help the vehicle system prepare a best estimate of the environment (or aspect(s) thereof) that was/were not identified during the first training phase and ultimately take an appropriate action.

As a sample illustration, a vehicle may receive a trained machine learning model to use for navigation throughout an environment. If the vehicle encounters a situation unknown in the training data or an environment the vehicle has never seen before, the vehicle may capture sensor data associated with the new environment or object and prepare a best estimation of the situation. The estimation is provided to the trained machine learning model and reward points are assigned to the estimation, based on the accuracy of the estimation. In some examples, reward points are assigned to the estimation when the system declares that the estimation is made with some threshold level of confidence. If the system does not declare any confidence in the estimation, no points are awarded. These points may be applied in a cost function used by the system.

In this way, the system can gauge objects it encounters in the environment during run time, and dynamically determine whether or not the adaptations are working well. The system can train for unknown examples during runtime and after the trained model has been provided to the vehicle system. In the camel illustration, the system may learn about a camel on the road by encountering the camel, and estimating future actions performed by the camel, based on actions of similar creatures found in the training data, even though the original training data did not provide a camel on the road.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Embodiments of the present disclosure can provide systems and methods that implement domain adaptation. For example, the system may train a machine learning model on general data and adapt it for a specific use case, such as objects and environments encountered with autonomous or semi-autonomous driving systems, as well as any machine learning application. In particular, one or more embodiments of the disclosed technology include a computer system that is configured to train a model to match first input data to perform a first training task. This may include image recognition (e.g., recognizing faces, identifying dogs or cats, etc.) and/or segmentation analysis. The system may use the model to perform a second task that was not identified during the training of the first training task. For example, using a second sequence of input data, the system may train a modified model to determine an accuracy estimation on the second task. This may include image recognition of unknown objects (e.g. recognize camels on the road), segmentation (e.g., recognize a type of animal and not another car, etc.), or other machine learning tasks. The system may compute a second score corresponding with the second task (e.g., recognition error, etc.) and regress the second score. The regression may be performed per example, by an additional measure of data prevalence, or by confidence in the estimation, using a machine learning model that is trained in addition to the machine learning model that is trained to perform the second task.

FIG. 1 is an illustrative representation of a computer system for implementing domain adaptation, in accordance with one or more embodiments of the disclosure. Computer system 102 may comprise computer readable medium 104, input engine 110, training engine 112, modeling engine 114, scoring distance engine 116, and vehicle action engine 118. Other components and engines (e.g., processor, memory, etc.) have been removed from the illustration of computer system 102 in order to focus on these features. Additional features of computer system 102 are provided with FIGS. 4-5.

Figure 4:
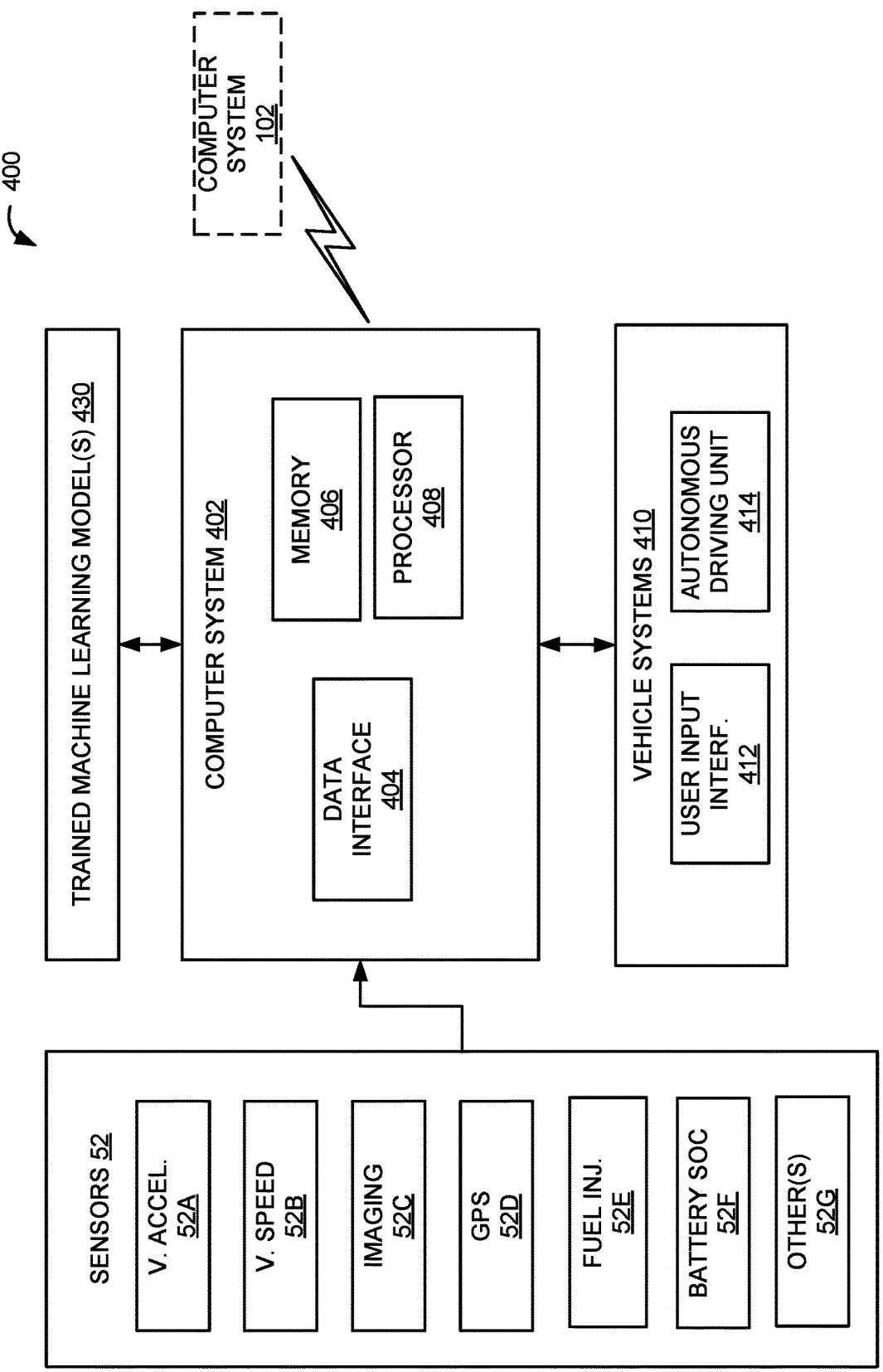
FIG. 4 illustrates an example block diagram of a vehicle that may use a machine learning system, in accordance with one or more embodiments of the disclosure.

Input engine 110 is configured to receive and/or store input training data. For example, input engine 110 may interact with a receiver configured to receive input data from one or more sensors of the vehicle, as illustrated in FIG. 4. Input engine 110 may be configured to store one or more input features corresponding to the input data used in training one or more machine learning models in a memory.

In sample illustrations, input training data may comprise moving objects (e.g., pedestrians, cyclists, animals, vehicles, etc.) or stationary objects (e.g., buildings, landscaping, etc.). Input training data may comprise a time frame of actions performed by the objects, including movement in various directions.

Training engine 112 is configured to train a machine learning model using training data. The training data may comprise historical object and task information of objects found in an environment. For example, the training data may comprise pedestrians, vehicles, and animals found in a city environment while a vehicle is driving on a road in the city environment. The training data may comprise expected movements or tasks initiated by each of the objects, including for example a pedestrian's ability to walk, run, or move across an intersection. Training engine 112 may determine one or more weights assigned to each of these input features according to an expected performance of the object (e.g. how likely the object is to run, walk, move across an intersection, etc.). Training engine 112 may train the first machine learning model to correlate an image or action in the input data with a training task.

Modeling engine 114 is configured to correlate weights (e.g., the strength of the connection) and biases (e.g., constant parameters added to influence the effect of weighted inputs) between the input training data and some inference determined by the model. Modeling engine 114 may correspond with a linear or non-linear machine learning (ML) function. For example, the ML model may comprise a supervised learning algorithm including a decision tree that accepts the one or more objects from input training data to provide a confidence score on how likely the object will perform some task.

Modeling engine 114 is configured to implement a regression analysis, including linear regression. Linear regression may model the relationship between the dependent variable (e.g., confidence of estimation of unknown task) and one or more independent variables (e.g., the unknown task). In some examples, the dependent variable may be transformed using a logarithm, fixed maximum value, or other transformation or adjustment.

Modeling engine 114 is also configured to compute a second score corresponding with the second task (e.g., recognition error, etc.) and regress the second score. The regression may be performed per example, by an additional measure of data prevalence, or by confidence in the estimation, using a machine learning model that is trained in addition to the machine learning model that is trained to perform the second task.

Modeling engine 114 is configured to implement a reinforcement learning. For example, modeling engine 114 may be configured to determine which actions a software agent should take in order to maximize an accuracy score in association with scoring distance engine 116.

As a sample illustration, the task may include estimating a movement of an object 1-3 seconds into the future. Using reinforcement learning (RL), for example, modeling engine 114 may sample the position of the action and input data, and calculate a trajectory of the sample in the future based on a current position. In association with scoring distance engine 116, the system may calculate similarity measures between the estimated future action and the actual actions identified in input data that the system will receive. Modeling engine 114 and/or scoring distance engine 116 may determine how close the estimated future action is to the actual action in the data set, and adjust input data received to increase the density or amount of input data the system receives.

Modeling engine 114 is configured to implement multiple competing models and select the best suited machine learning model for the task (e.g., based on downstream likelihood of success and/or the highest expected accuracy score for the input data). For example, a first model may implement an image recognition process for identifying dogs and cats, and a second model may implement an image recognition process for identifying vehicles and cyclists. Modeling engine 114 may receive new input data that appears to correlate to an animal and select the first model to apply to the new input data. In another example, modeling engine 114 performs a third training task, and the system selects a third machine learning model from a plurality of machine learning models based on a corresponding accuracy score for the third machine learning model.

Scoring distance engine 116 is configured to determine a proximity or distance in similarity between an object received in input data and the input data used in training one or more models. As a simple illustration, the model may be trained with objects identified in a city environment, but the vehicle may encounter zoo animals or objects found in the Sahara. Scoring distance engine 116 may be configured to identify that the objects in the new input data are not matched to the objects in the training input data that based on a calculation of the distance score, but may still regress the object in the new input data as being similar enough (e.g., within a similarity threshold) based on the calculated distance.

Scoring distance engine 116 is also configured to analyze a likelihood of performing a task accurately. For example, a task may include image recognition of an unknown object. Scoring distance engine 116 may calculate the similarity between known objects in training input data and the new unknown object, and determine a likelihood of identifying the new unknown object based on the similarity of the new unknown object to the training input data objects.

Scoring distance engine 116 is configured to calculate a reward point based on, for example, the likelihood of performing a task. For example, if the vehicle encounters a situation unknown in the training data or an environment the vehicle has never seen before, the vehicle may capture input data associated with the new environment or object and prepare a best estimation of the situation. The estimation is provided to the trained machine learning model and reward points are assigned to the estimation, based on the accuracy of the estimation. In some examples, reward points are assigned to the estimation when the system declares that the estimation is made with some threshold level of confidence. If the system does not declare any confidence in the estimation, no points are awarded. These points may be applied in a cost function used by the system.

Scoring distance engine 116 may be configured to regress errors on the input data. For example, given the output on the finetuning dataset examples, scoring distance engine 116 may compute the error. Scoring distance engine 116 may also be configured to compute or apply an error mask (e.g., do well on 90% of the input data, pick which 10% the system should skip during optimization).

Scoring distance engine 116 may be configured to estimate example density and regress it by taking the input data and computing some measure of similarity of the objects in the input data. As a sample computation, scoring distance engine 116 may implement a nearest neighbor calculation and perform a distance computation between the nearest neighbors to identify the density (e.g., if 12 nearest neighbors, what is the distance between the neighbors). In another sample computation, scoring distance engine 116 may be configured to implement class or output entropy measures (e.g., the nearest sample object from the input data and compute the distance value).

Vehicle action engine 118 is configured to propagate a signal to a driver of the vehicle to take over control of the vehicle in association with the confidence score. In some examples, vehicle action engine 118 is also configured to initiate control of the vehicle in autonomous mode in association with the confidence score. For example, the action performed by the vehicle may attempt to remove the vehicle from a hazard (e.g., slowing down or speeding up, etc.), taking an alternate path, or change control of the vehicle's actions (e.g., initiating autonomous or driver-controlled mode, etc.).

Figure 2:
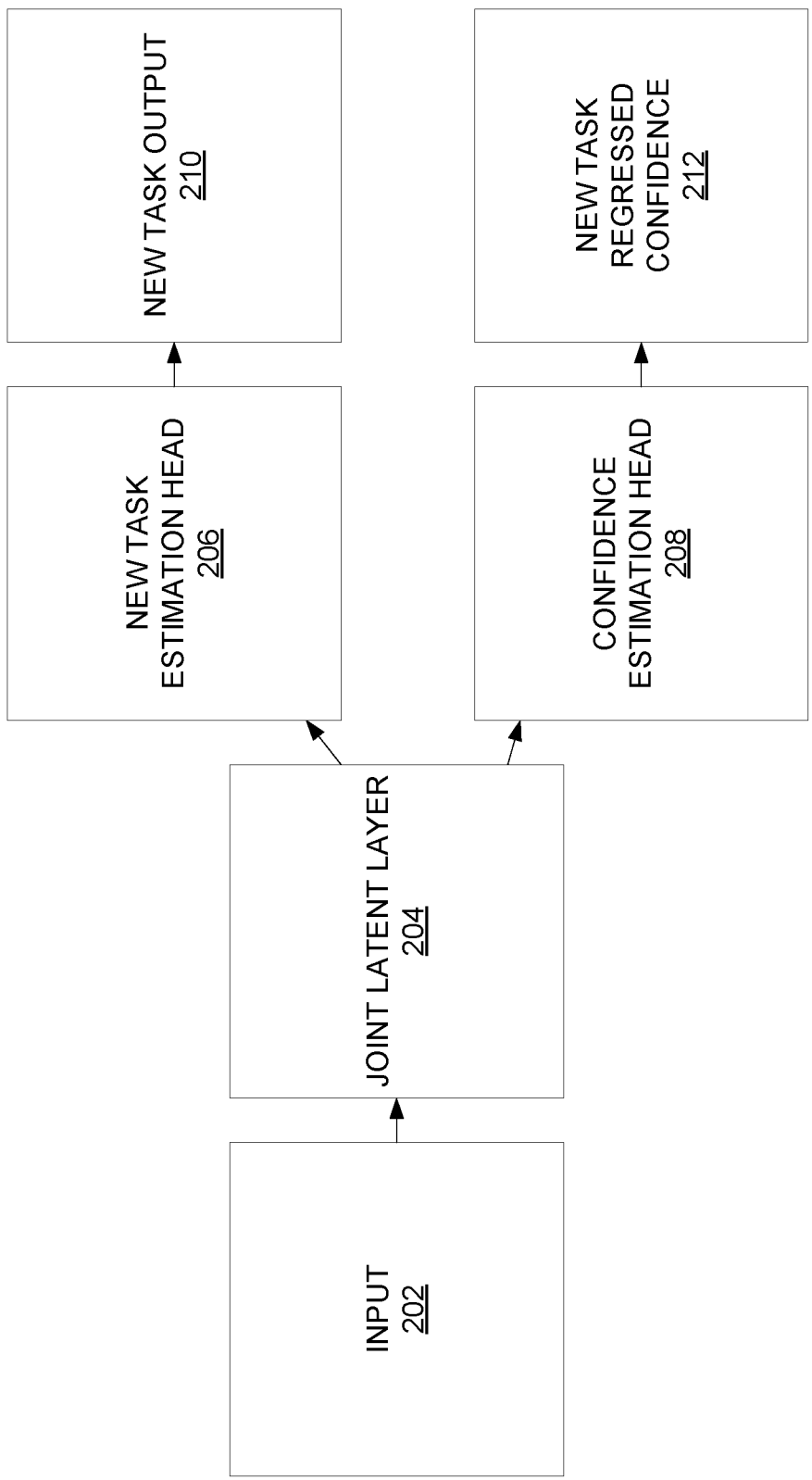
FIG. 2 is an illustrative process flow for implementing domain adaptation, in accordance with one or more embodiments of the disclosure.

FIG. 2 is an illustrative process flow for implementing domain adaptation, in accordance with one or more embodiments of the disclosure. In an illustrative example, the process may perform dissection of one or more machine learning models, where the machine learning models comprise a plurality of operations, including input 202, joint latent layer 204, new task estimation head 206, confidence estimation head 208, new task output 210, and new task regressed confidence 212. Input 202 may correspond with sensor data and/or options received by the system. Joint latent layer 204 may run individual tasks, including a new task estimation head 206, a confidence estimation head 208, and so on, which may be trained on previous tasks or historical data. Joint latent layer 204 may be replaced with a second head that is trained to better implement each individual task.

In an illustrative example, input 202 may receive sensor data. The sensor data may be provided to joint latent layer 204, which is pre-trained based on an old task. The output of joint latent layer 204 may generate new task estimation head 206 and confidence estimation head 208. New task estimation head 206 may generate new task output 210 as a rare event prediction and detection, using the methods described herein. Confidence estimation head 208 may generate a confidence score on how accurately the rare event is predicted or detected (e.g., using various machine learning processes) and generate a new task regression confidence 212 (e.g., using various regression processes).

Figure 3:
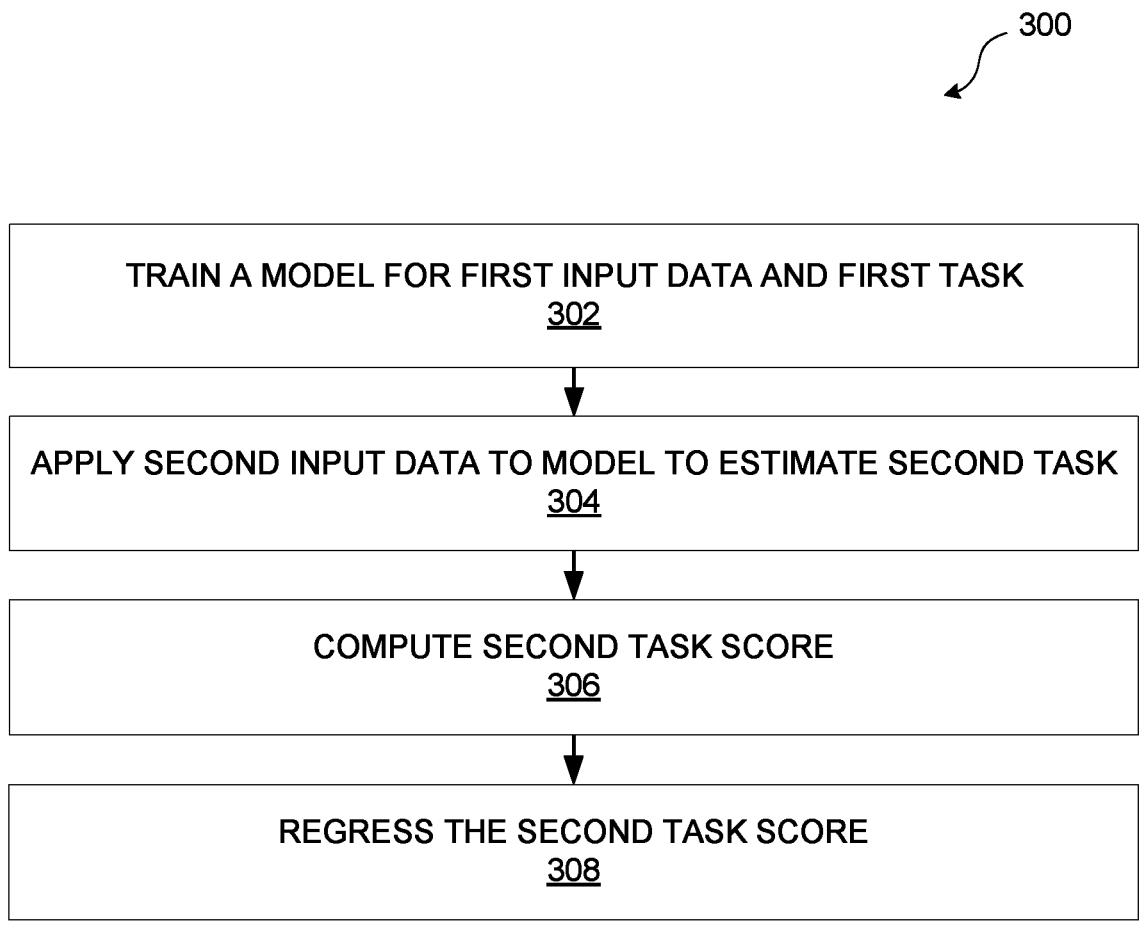
FIG. 3 illustrates example operations of a computer implemented method, in accordance with one or more embodiments of the disclosure.

FIG. 3 provides operations that may be carried out in connection with computer implemented method 300, according to one or more embodiments of the present disclosure. For example, computer system 102 of FIG. 1 or computer system 402 of FIG. 4 may implement the operations described herein.

At operation 302, computer implemented method 300 may train a model for first input and a first task. For example, the processor may be configured to train a model to match a first stream of input data and a relevant training task (e.g., recognizing faces and dog images).

At operation 304, computer implemented method 300 may apply second input data to model to estimate a second task. For example, the processor may be configured to receive a second sequence of input data to train a modified model. The modified model may compute a good estimation of performance on the second task (e.g., recognizing camels on the road).

At operation 306, computer implemented method 300 may compute a second task score. For example, the processor may compute the second task score per data example in the second sequence of data (e.g., recognition error on the camel detection task).

At operation 308, computer implemented method 300 may regress the second task score. For example, the processor may regress the second task score per example and/or additional measures of data prevalence for confidence in the estimation using a machine learning model that is trained in addition to the second task trained model (e.g., train the network starting with operation 304 to regress the second task error). In some examples, the confidence estimation may be based on a density estimation, including statistics examples for looking at confidence, density, and the like.

FIG. 4 provides a diagram of example system 400 that depicts various systems and elements that may be present on a vehicle with or in which aspects of the present disclosure may be implemented. For example, system 400 may include one or more sensors 52, computer system 402, and/or vehicle systems 410 (which may include user input interface 412 and autonomous driving unit 414). As shown in FIG. 4 and described herein, computer system 402 may be coupled to computer system 102.

As shown in FIG. 1, computer system 102 may include machine learning system 104. Machine learning system 104 may be used to implement various operations of computer implemented methods 200 and 300, as described herein. For example, computer readable medium 104 of computer system 102 may comprise one or more engines, including input engine 110, training engine 112, modeling engine 114, scoring distance engine 116, and vehicle action engine 118. These engines may be configured to train a model for first input and a first task (e.g., operation 302), apply second input data to model to estimate a second task (e.g., operation 304), compute a second task score (e.g., operation 306), and regress the second task score (e.g., operation 308).

Turning again to FIG. 4, the information output by computer readable medium 104 of computer system 102 may be conveyed to computer system 402 which may be on board a vehicle. For example, the information may be uploaded as an executable file to the vehicle as one or more trained machine learning models. Computer system 402 may then use the information to compute the confidence in performing some action, whether the action is included with the first training data (e.g., a first task) or not included with the first training data (e.g., a second task). Additionally, for example, computer system 402 may obtain information from sensors 52, such as imaging information, and process the information through trained learning models 430 to assist in controlling vehicle systems 410, including autonomous driving unit 414. It should be noted that in one or more embodiments autonomous driving unit 414 may be a semi-autonomous, assisted driving, or other vehicle control unit.

By way of illustration, the imaging information captured using imaging sensor 52C may include an object to be detected. Computer system 402 may use trained models 430 to determine whether the obstacle is a known object (e.g., pedestrian, animal, etc.) and provide information to vehicle systems 410 that enables autonomous driving unit 414 to perform an action by the vehicle (e.g., propagate an alert, control operation of the vehicle, etc.).

In some examples, an action may be initiated in correlation with output provided by trained machine learning models 430. The action may update user input interface 412 with a signal propagated to the driver to take an action with the vehicle. The action may include alerting a driver of the vehicle to a potential hazard or collision, speeding up or slowing the vehicle, or other actions identified by inferences produced by the machine learning models 430.

As alluded to above, one or more sensors 52 may provide signals that indicate vehicle operating conditions or characteristics, or signals that can be used to derive vehicle operating conditions or characteristics. These may include, but are not limited to vehicle acceleration 52A, vehicle speed 52B, imaging 52C, global positioning system (GPS) 52D, fuel injection 52E, battery 52F, and other sensors 52G. Accordingly, system 400 can include a plurality of sensors 52 that can be used to detect various conditions internal or external to a vehicle and provide sensed conditions to computer system 402 (which may be implemented as one or a plurality of individual control circuits) or vehicle systems 410.

In one or more embodiments, one or more of the sensors 52 may include their own processing capability to compute the results for additional information that can be provided to other elements of system 400, such as computer system 402 and/or vehicle systems 410. In one or more embodiments, one or more of sensors 52 may be data-gathering-only sensors that provide only raw data to other blocks within system 400. In one or more embodiments, hybrid sensors may be included that provide a combination of raw data and processed data. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles (including, for example, pedestrians, bicyclists, other vehicles, etc.), and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Sensors 52 can provide information to computer system 402 via data interface 404. For example, imaging sensor 52C may provide images or video to computer system 402 via data interface 404. Computer system 402 can process the images or video and communicate with vehicle systems 410 for purposes of autonomous, semi-autonomous, assisted, or other types of driving using autonomous driving unit 414, or for other forms of vehicle control.

Computer system 402 can include circuitry to control various aspects of the machine learning operations described herein. For example, computer system 402 may include a microcomputer that includes a one or more processing units 408 (e.g., microprocessors), memory storage 406 (e.g., RAM, ROM, etc.), and I/O devices (e.g., data interface 404). The processing units of computer system 402 execute instructions stored in memory 406 to control one or more systems or subsystems in system 400, including vehicle systems 410 and in particular autonomous driving unit 414.

Processor 408 can include a GPU, CPU, microprocessor, or any other suitable processing system. Memory 406 may include one or more various forms of memory or data storage (e.g., flash, RAM, etc.) that may be used to store trained learning machine learning models 430 that may be uploaded from remote computer system 102 via any type of communication medium, instructions and variables for processor 408 as well as any other suitable information. For example, computer system 402 shown in FIG. 4 can be used, possibly in conjunction with computer system 102 shown in FIG. 1, to perform various operations of methods described throughout the disclosure and output information that may be used to determine the confidence of the accuracy of performing some task. This information may be communicated to computer system 402 on board a vehicle via any form of wired or wireless communication. By way of example, the information may be uploaded as a executable file.

Memory 406 can be made up of one or more modules of one or more different types of memory, and may be configured to store data and other information as well as operational instructions that may be used by the processor 408 to perform machine learning functions within the vehicle.

Although the example of FIG. 4 is illustrated using processor and memory circuitry, as described below with reference to circuits disclosed herein, machine learning system can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up computer system 402.

As alluded to above, computer system 402 may include one or more communication circuits, including either or both a wireless transceiver circuit with an associated antenna (not illustrated) and/or a wired I/O interface with an associated hardwired data port (not illustrated) to couple to sensors 52 and/or computer system 402. Communications between computer system 402 and sensors 52 illustrated in FIG. 4 or computer system 102 illustrated in FIG. 1 can include either or both wired and wireless communications circuits to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise.

Data interface 404 can include a transmitter and a receiver (not shown) for hardwired communications with other devices. For example, data interface 404 can provide a hardwired interface to other components, including sensors 52, vehicle systems 410, and/or computer system 102. Data interface 404 can communicate with other devices using Ethernet or any of a number of other wired communication protocols whether standardized, proprietary, open, point-to-point, networked or otherwise.

It should also be appreciated that in one or more embodiments, computer system 402 may be omitted. In such embodiments, sensors 52 may be coupled to vehicle system 410 and trained machine learning models 430 may be uploaded to memory accessible to vehicle systems 410 and used by autonomous driving unit 414. It will be appreciated in such embodiments that vehicle systems 410 may include a data interface, communications circuits, memory, and a processor.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Figure 5:
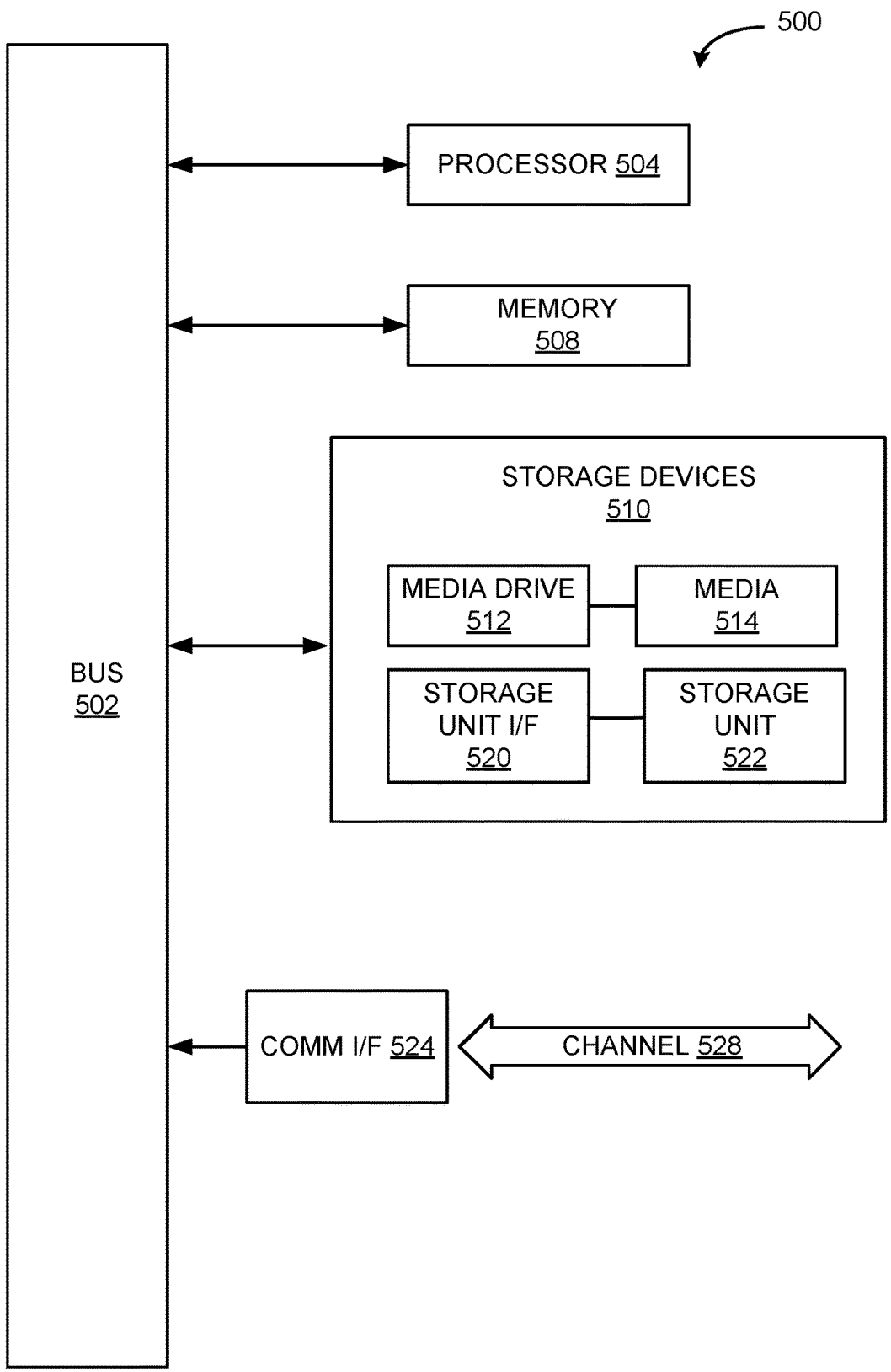
FIG. 5 is an example computing component that may be used to implement various features of one or more embodiments described in the present disclosure.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principles disclosed herein may also extend to other vehicle types as well.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDAs, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up computer system 102, machine learning system 402, and/or vehicle systems 410. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage devices 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium," "computer readable medium," and "computer usable medium" are used to generally refer to transitory or non-transitory media (e.g., computer readable medium 104). Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions or operations of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for updating a first machine learning model, the system comprising:
    a receiver configured to receive first input data;
    a memory configured to store the first machine learning model and a set of features corresponding to the first input data used during training of the first machine learning model; and
    a processor configured to execute machine readable instructions stored in the memory to:
        train the first machine learning model to correlate an image or action in the first input data with a first training task;
        determine a first accuracy score of the first machine learning model when the first machine learning model is applied to a second training task using the first input data;
        using second input data, compute a second accuracy score per data example in the second input data, wherein the second input data includes different images or actions than the first input data; and
        regress the second accuracy score per data example using a second machine learning model, wherein the second machine learning model is trained to correlate the different images or actions in the second input data to the second training task,
        wherein the second machine learning model is transmitted to a vehicle, wherein the vehicle performs an action based on the second machine learning model, wherein the second machine learning model is updated at the vehicle, and wherein the vehicle transmits confidence estimates corresponding to the second machine learning model to the receiver.

2. The system for updating the first machine learning model of claim 1, wherein the first accuracy score and the second accuracy score implement a density estimation.

3. The system for updating the first machine learning model of claim 1, wherein the instructions further to:
    perform a third training task, wherein the system selects a third machine learning model from a plurality of machine learning models based on a corresponding accuracy score for the third machine learning model.

4. The system for updating the first machine learning model of claim 1, wherein the action includes alerting a driver of the vehicle to a potential hazard.

5. The system for updating the first machine learning model of claim 1, wherein the action includes slowing the vehicle.

6. The system for updating the first machine learning model of claim 1, wherein the second input data includes images of a vehicle scenario not encountered during the training of the first machine learning model.

7. The system for updating the first machine learning model of claim 1, wherein the first machine learning model is a decision tree supervised learning algorithm.

8. The system for updating the first machine learning model of claim 1, wherein the first machine learning model provides a confidence score on how likely an object in the image of the first input data will perform a task.

9. The system for updating the first machine learning model of claim 1, wherein the first training task estimates a movement of an object into a future time using reinforcement learning (RL).

10. A method of updating a first machine learning model comprising:
    training the first machine learning model to correlate an image or action in first input data with a first training task;
    determining a first accuracy score of the first machine learning model when the first machine learning model is applied to a second training task using the first input data;
    using second input data, computing a second accuracy score per data example in the second input data, wherein the second input data includes different images or actions than the first input data;
    regressing the second accuracy score per data example using a second machine learning model, wherein the second machine learning model is trained to correlate the different images or actions in the second input data to the second training task;
    transmitting the second machine learning model to a vehicle, wherein the vehicle performs an action based on the second machine learning model; and
    updating the second machine learning model at the vehicle, wherein the vehicle transmits confidence estimates corresponding to the second machine learning model to a receiver.

11. The method of claim 10, wherein the first accuracy score and the second accuracy score implement a density estimation.

12. The method of claim 10, further comprising:
    performing a third training task, wherein the third training task comprises selecting a third machine learning model from a plurality of machine learning models based on a corresponding accuracy score for the third machine learning model.

13. The method of claim 10, wherein the action includes alerting a driver of the vehicle to a potential hazard.

14. The method of claim 10, wherein the action includes slowing the vehicle.

15. A system for updating a first machine learning model, the system comprising:
    a receiver configured to receive first input data;
    a memory configured to store the first machine learning model and a set of features corresponding to the first input data used during training of the first machine learning model; and a processor configured to execute machine readable instructions stored in the memory to:
  train the first machine learning model to correlate an image or action in the first input data with a first training task;
  determine a first accuracy score of the first machine learning model when the first machine learning model is applied to a second training task using the first input data;
  using second input data, compute a second accuracy score per data example in the second input data, wherein the second input data includes different images or actions than the first input data; and
  regress the second accuracy score per data example using a second machine learning model, wherein the second machine learning model is trained to correlate the different images or actions in the second input data to the second training task,
  wherein the second machine learning model comprises multiple competing models, and wherein the instructions further to: select a best suited machine learning model from the multiple competing models for the second training task based on downstream likelihood of success.

16. The system for updating the first machine learning model of claim 15, wherein the second input data includes images of a vehicle scenario not encountered during the training of the first machine learning model.

17. The system for updating the first machine learning model of claim 15, wherein the first machine learning model is a decision tree supervised learning algorithm.

18. The system for updating the first machine learning model of claim 15, wherein the first machine learning model provides a confidence score on how likely an object in the image of the first input data will perform a task.

19. The system for updating the first machine learning model of claim 15, wherein the first training task estimates a movement of an object into a future time using reinforcement learning (RL).

20. A system for updating a first machine learning model, the system comprising:
  a receiver configured to receive first input data;
  a memory configured to store the first machine learning model and a set of features corresponding to the first input data used during training of the first machine learning model; and
  a processor configured to execute machine readable instructions stored in the memory to:
    train the first machine learning model to correlate an image or action in the first input data with a first training task;
    determine a first accuracy score of the first machine learning model when the first machine learning model is applied to a second training task using the first input data;
    using second input data, compute a second accuracy score per data example in the second input data, wherein the second input data includes different images or actions than the first input data; and
    regress the second accuracy score per data example using a second machine learning model, wherein the second machine learning model is trained to correlate the different images or actions in the second input data to the second training task,
    wherein the second machine learning model comprises multiple competing models, and wherein the instructions further to: select a best suited machine learning model from the multiple competing models for the second training task based on a highest expected accuracy score for the second input data.

21. The system for updating the first machine learning model of claim 20, wherein the second input data includes images of a vehicle scenario not encountered during the training of the first machine learning model.

22. The system for updating the first machine learning model of claim 20, wherein the first machine learning model is a decision tree supervised learning algorithm.

23. The system for updating the first machine learning model of claim 20, wherein the first machine learning model provides a confidence score on how likely an object in the image of the first input data will perform a task.

24. The system for updating the first machine learning model of claim 20, wherein the first training task estimates a movement of an object into a future time using reinforcement learning (RL).

* * * * *